Dec. 11, 1934.  A. G. VON SODEN-FRAUNHOFEN  1,983,955

CHANGE SPEED GEAR

Filed May 3, 1933

Inventor:

Patented Dec. 11, 1934

1,983,955

UNITED STATES PATENT OFFICE 1,983,955

CHANGE SPEED GEAR

Alfred Graf von Soden-Fraunhofen, Friedrichshafen, Germany, assignor to Zahnradfabrik Friedrichshafen Aktiengesellschaft, Friedrichshafen, Bodensee, Germany Application May 3, 1933, Serial No. 669,102
In Germany May 17, 1932

2 Claims. (Cl. 74—326)

My invention relates to change speed gears and has special reference to gears of this kind which are mounted in motor driven vehicles running on rails such as street cars, motor locomotives and the like.

For causing a speed change in such gears it is usual to shift one or more gears into or out of engagement with corresponding gears, or with gears in constant mesh claw couplings are shifted on the shafts.

According to my invention I provide in my new type of change speed gear two kinds of over-running devices in combination, that is one-way-driving mechanism, such as free-wheel or over-running clutch mechanisms in connection with the journaling of some of the gears, and inclined front faces on the claw couplings for coupling some of the gears to their respective shafts.

By this new arrangement I do not need any synchronizing means such as friction clutches and the like which have to be of great dimensions and are extremely heavy. Besides such friction clutches are of disadvantage because of the wear of the friction material which also causes dirt in the gearing.

The drawing represents an example embodying my invention.

Figure 1:
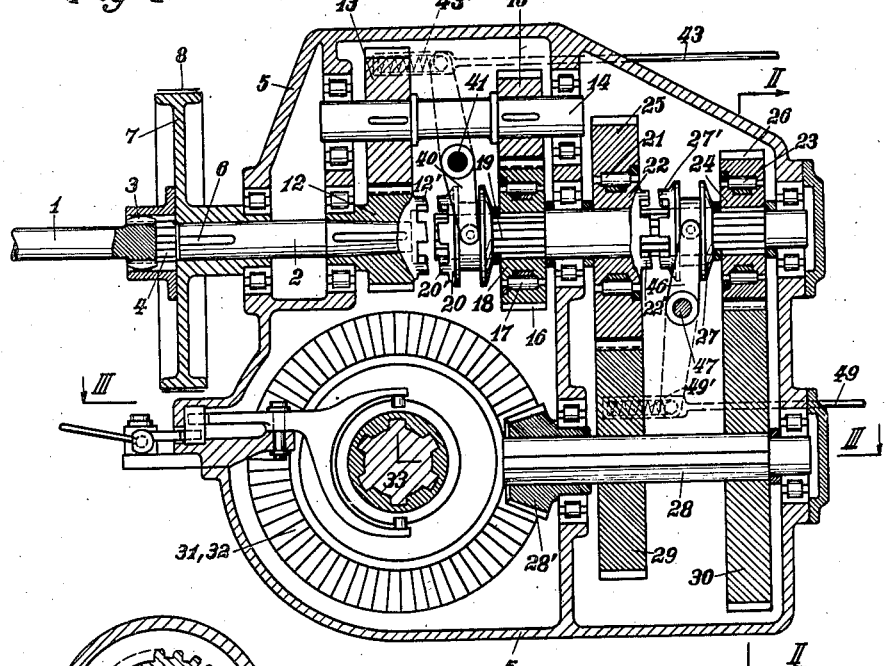
Fig. 1 is a vertical section through a change speed gear.
Figure 2:
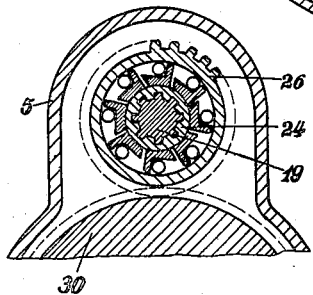
Fig. 2 is a section, taken on line II—II of Fig. 1.
Figure 3:
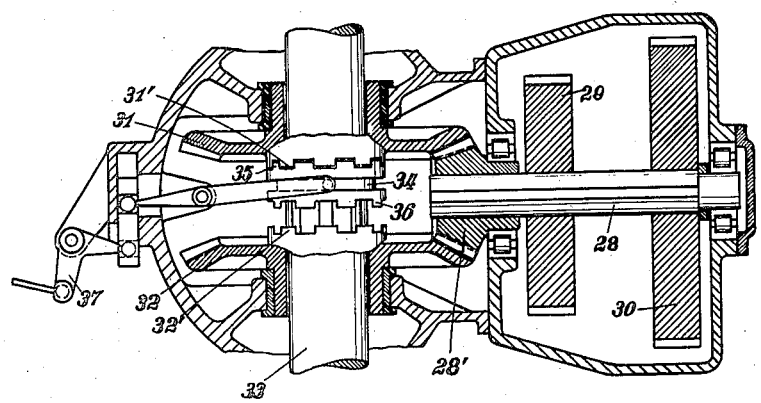
Fig. 3 represents a horizontal section through the lower part of the gear as shown in Fig. 1, taken on line III—III thereof.

Shaft 1 coming from the motor (not represented) is connected to shaft 2 by means of a flexible link 3/4 allowing for a certain play with regard to the directions of both shafts. Shaft 2 is journaled in the gear casing 5 and has a brake 7/8 fixed to it by means of keys 6. This brake may serve for braking shaft 2 if desired.

Rigidly fixed to shaft 2 is gear 12 which meshes constantly with gear 13 fixed to stub shaft 14. There is a second gear 15 also fixed to shaft 14 and in constant mesh with gear 16 on shaft 19, but between gear 16 and shaft 19 a free-wheel or overrunning clutch mechanism 17/18 is inserted, which allows for gear 16 to run idle in one direction of rotation.

Between shaft 2 and shaft 19 there is a claw coupling which comprises claws 12' on gear 12 and a sleeve 20 with claws 20' splined to shaft 19 and adapted to be shifted into or out of engagement by means of forked lever 40 journaled at 41 and rocked by rod 43, spring 43' being inserted in between.

Mounted on shaft 19 are also gears 25 and 26; but there are free-wheel or overrunning clutch mechanisms 21/22 and 23/24, respectively, so provided that the gears are apt to overrun their hub in one direction of rotation. The inner member 22 of the free-wheel mechanism belonging to gear 25 is loosely journaled on shaft 19 and has claws 22' adapted to engage with claws 27' of sleeve 27 splined to shaft 19. Sleeve 27 can be shifted by means of forked lever 46 journaled at 47 and adapted to be rocked by means of rod 49, spring 49' being inserted in between. Inner part 24 of the free-wheel mechanism belonging to gear 26 is keyed to shaft 19.

Gear 29 is rigidly fixed to shaft 28 and in constant mesh with gear 25; gear 30 meshing constantly with gear 26 is also fixed to shaft 28. There is bevelled gear 28' also in rigid connection with shaft 28 and in driving engagement with bevelled gears 31 and 32 which are loosely journaled on shaft 33. Sleeve 34 is splined to shaft 33 and adapted to be shifted by means of lever 37 so as to cause driving connection between gear 31 and shaft 33 by means of claws 31' and 35 or between gear 32 and shaft 33 by means of claws 32' and 36. This latter arrangement serves for reversing the driving direction, which is of special importance with vehicles on rails.

The change speed gear represented allows for four different forward speeds and for the same number of reverse speeds. The first speed makes use of the following elements: shaft 2, gear 12, gear 13, shaft 14, gears 15 and 16, shaft 19, gear 26, gear 30, shaft 28, gear 28', gear 31, shaft 33.

In the second speed sleeve 27 is shifted to its left hand position causing driving connection between shaft 19 and gear 25. Consequently shaft 28 is now driven by gears 25 and 29 and will rotate faster than before in the first speed; still gears 26 and 30 are in mesh, but this does not matter, because of the free-wheel or overrunning clutch mechanism 23/24 which allows for gear 26 to overrun shaft 19.

For attaining the third speed sleeve 20 is shifted into its left hand position causing direct connection between shafts 2 and 19, and at the same time sleeve 27 is shifted back to its right hand position. The driving connection is now: shaft 2, shaft 19, gears 26 and 30, shaft 28, gears 28' and 31, shaft 33. In this case shaft 19 overruns gear 16 by means of free-wheel or overrunning clutch mechanism 17/18, and because of free-wheel mechanism 21/22 shaft 19 also overruns gear 25, just as it does when the first speed is set.

To get to the fourth speed out of the third speed nothing is necessary but to shift sleeve 27 back into its left hand position, thereby eliminating gears 26 and 30 and inserting instead gears 25 and 29.

For the purpose of avoiding shocks in connection with the speed changes the front faces of the teeth of claw couplings 12'/20' and 22'/27' are so inclined that the teeth rattle past each other when they are brought into contact and that they engage only after the originally slower coupling half just begins to overrun the originally faster half.

A change speed gear according to my invention is practically free from shocks in speed changes because of the special arrangement of the freewheel or overrunning clutch mechanisms and the inclination of the claw teeth, and all of its gears are in constant mesh. It is of special importance for vehicles running on rails which do not turn round but have to have all speeds in both moving directions.

I do not want to be limited to the details disclosed or shown in the drawing, as many variations will occur to those skilled in the art.

What I claim is:

1. In a change speed gearing, a drive shaft, a second shaft substantially in alignment with the drive shaft, means for connecting said two shafts directly, means for driving said second shaft indirectly from the first shaft at a reduced speed, said indirect driving means including an overrunning clutch, said clutch permitting said second shaft to overrun said indirect driving means when said first and second shafts are directly connected, a third shaft substantially parallel to said other two shafts, a first means including an overrunning clutch for driving said third shaft from said second shaft at one speed relative to said second shaft, a second driving means also including an overrunning clutch for driving said third shaft from said second shaft at a higher speed than that produced through said first driving means, and means for putting said second driving means into and out of action, each of said overrunning clutches in the respective drives between the second and third shafts permitting its driving means to overrun one of said shafts when the third shaft is being driven through the driving means including the other of said overrunning clutches.

2. A change speed gearing as in claim 1, further including the feature that said means for directly connecting the first and second shafts and also said means for putting said second driving means between the second and third shafts into and out of action are claw couplings having teeth with so inclined front faces that the coupling halves coming into contact rattle past each other until the originally slower coupling half begins to overrun the originally faster half, and characterized by the fact that the several overrunning clutches aforesaid enable the originally slower half of each of said claw couplings coming into contact with the originally faster half to speed up and begin to overrun the originally faster half in the one instance independently of the indirect driving means between the first and second shafts and in the other instance independently of the first driving means between the second and third shafts.

ALFRED GRAF v. SODEN-FRAUNHOFEN.